United States Patent
Mori et al.

(10) Patent No.: US 8,752,596 B2
(45) Date of Patent: Jun. 17, 2014

(54) HYDROGEN FILLING SYSTEM AND HYDROGEN FILLING METHOD

(75) Inventors: Daigoro Mori, Tokyo-to (JP); Kumiko Nishizawa, Susono (JP); Kosei Yoshida, Gotenba (JP); Keiji Toh, Kariya (JP); Shintaro Watanabe, Kariya (JP); Hidefumi Oishi, Kariya (JP); Hidehito Kubo, Kariya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 307 days.

(21) Appl. No.: 13/378,864

(22) PCT Filed: Jun. 17, 2010

(86) PCT No.: PCT/IB2010/001463
§ 371 (c)(1),
(2), (4) Date: Jan. 27, 2012

(87) PCT Pub. No.: WO2010/146448
PCT Pub. Date: Dec. 23, 2010

(65) Prior Publication Data
US 2012/0111447 A1    May 10, 2012

(30) Foreign Application Priority Data
Jun. 17, 2009    (JP) .................................. 2009-144239

(51) Int. Cl.
*B65B 1/20* (2006.01)
*F17C 13/08* (2006.01)
*F17C 3/02* (2006.01)

(52) U.S. Cl.
CPC ............... *F17C 3/025* (2013.01); *Y02E 60/321* (2013.01)

USPC .................. 141/82; 141/94; 141/95; 62/45.1; 62/53.2

(58) Field of Classification Search
USPC .................. 141/82, 94, 95, 98; 62/45.1, 53.2
See application file for complete search history.

(56) References Cited

U.S. PATENT DOCUMENTS

| 6,631,615 B2 * | 10/2003 | Drube et al. .................... 62/50.4 |
| 6,725,672 B2 * | 4/2004 | Shimada et al. ................ 62/48.1 |
| 7,124,790 B2 * | 10/2006 | Bushko ........................... 141/82 |

(Continued)

FOREIGN PATENT DOCUMENTS

| CN | 1789918 A | 6/2006 |
| EP | 1 788 300 A2 | 5/2007 |

(Continued)

OTHER PUBLICATIONS

International Preliminary Report on Patentability for corresponding International Patent Application No. PCT/IB2010/001463 mailed Sep. 20, 2011.

(Continued)

*Primary Examiner* — Timothy L Maust
(74) *Attorney, Agent, or Firm* — Sughrue Mion, PLLC (57) ABSTRACT

A hydrogen filling system includes: a hydrogen tank that is filled with hydrogen; a determination unit that determines whether to fill hydrogen into the hydrogen tank; and a temperature regulating unit that regulates a temperature of the hydrogen tank, wherein, when the determination unit determines to fill hydrogen into the hydrogen tank, the temperature regulating unit starts cooling the hydrogen tank before filling of hydrogen into the hydrogen tank is started.

3 Claims, 3 Drawing Sheets

(56) References Cited

U.S. PATENT DOCUMENTS

| | | | |
|---|---|---|---|
| 7,406,987 B2 * | 8/2008 | Takano et al. | 141/82 |
| 7,757,726 B2 * | 7/2010 | Handa | 141/82 |
| 7,866,354 B2 * | 1/2011 | Kanoya et al. | 141/95 |
| 7,988,926 B2 * | 8/2011 | Schmidt-Ihn et al. | 422/198 |
| 2003/0070434 A1 | 4/2003 | Shimada et al. | |
| 2007/0017597 A1 | 1/2007 | Klebe et al. | |
| 2008/0016884 A1 | 1/2008 | Kesten et al. | |

FOREIGN PATENT DOCUMENTS

| | | |
|---|---|---|
| EP | 1 915 567 B1 | 2/2009 |
| JP | 2001-239847 A | 9/2001 |
| JP | 2004-281243 A | 10/2004 |
| JP | 2007-040390 A | 2/2007 |
| JP | 2007-303625 A | 11/2007 |

OTHER PUBLICATIONS

International Search Report and Written Opinion for International Patent Application No. PCT/IB2010/001463 dated mailed Sep. 28, 2010.

Written Opinion of the International Preliminary Examining Authority for corresponding International Patent Application No. PCT/IB2010/001463 mailed May 12, 2011.

* cited by examiner

HYDROGEN FILLING SYSTEM AND HYDROGEN FILLING METHOD

BACKGROUND OF THE INVENTION

1. Field of the Invention

The invention relates to a hydrogen filling system and a hydrogen filling method.

2. Description of the Related Art

In recent years, a fuel cell receives attention as a power source that is excellent in operation efficiency and environmental performance. For example, a solid polymer electrolyte fuel cell generates electric power by an electrochemical reaction between hydrogen supplied to an anode electrode as fuel gas and air supplied to a cathode electrode as oxidant gas. Hydrogen gas is supplied from a hydrogen tank, filled with hydrogen gas, to the fuel cell, and a compressor is driven to supply air in the atmosphere to the fuel cell.

The hydrogen tank is filled with hydrogen gas in a hydrogen supply facility called a hydrogen station. For example, the hydrogen station includes a hydrogen gas cylinder bundle and a dispenser. The hydrogen gas cylinder bundle is a plurality of gas cylinders. The dispenser fills hydrogen, supplied from the hydrogen gas cylinder bundle, into the hydrogen tank. The dispenser is coupled to a filling port connected to the hydrogen tank, and fills hydrogen gas into the hydrogen tank by a pressure difference between the hydrogen gas cylinder bundle and the hydrogen tank.

When a hydrogen tank having a hydrogen storage alloy is filled with hydrogen, there is a technique for filling hydrogen into the hydrogen tank while cooling the hydrogen storage alloy in order to facilitate occlusion of hydrogen by the hydrogen storage alloy (for example, see Japanese Patent Application Publication No. 2004-281243 (JP-A-2004-281243). There is also a technique for filling hydrogen gas while cooling a fuel tank (for example, see Japanese Patent Application Publication No. 2007-40390 (JP-A-2007-40390)). There is also a technique for filling hydrogen; stored in a hydrogen storage source, into a hydrogen tank while cooling the hydrogen by an endothermic reaction that occurs at the time of releasing hydrogen from the hydrogen storage alloy (for example, see Japanese Patent Application Publication No. 2007-303625 (JP-A-2007-303625)).

In the existing art, in order to facilitate filling of hydrogen into the hydrogen tank, the hydrogen storage alloy or the hydrogen tank is cooled. However, when a vehicle arrives at a hydrogen station and then cooling of the hydrogen storage alloy or the hydrogen tank is started, the hydrogen storage alloy or the hydrogen tank is not sufficiently cooled immediately after the start of filling of hydrogen into the hydrogen tank. Thus, it takes time to complete filling of hydrogen into the hydrogen tank from the start of filling of hydrogen into the hydrogen tank.

SUMMARY OF THE INVENTION

The invention provides a technique for reducing a period of time during which hydrogen is filled into a hydrogen tank.

A first aspect of the invention provides a hydrogen filling system. The hydrogen filling system includes: a hydrogen tank that is filled with hydrogen; a determination unit that determines whether to fill hydrogen into the hydrogen tank; and a temperature regulating unit that regulates a temperature of the hydrogen tank, wherein, when the determination unit determines to fill hydrogen into the hydrogen tank, the temperature regulating unit starts cooling the hydrogen tank before filling of hydrogen into the hydrogen tank is started.

With the above hydrogen filling system, cooling of the hydrogen tank is started before filling of hydrogen into the hydrogen tank is started. Because hydrogen is filled into the hydrogen tank in a state where the hydrogen tank is sufficiently cooled, it is possible to reduce a period of time during which hydrogen is filled into the hydrogen tank. In addition, the hydrogen filling system may include a hydrogen supply source that supplies hydrogen to the hydrogen tank.

In addition, the hydrogen tank may be provided for a mobile unit.

In addition, in the hydrogen filling system, the determination unit may include a distance calculation unit that calculates a distance between the mobile unit and the hydrogen supply source, and may determine to fill hydrogen into the hydrogen tank when the distance between the mobile unit and the hydrogen supply source is shorter than or equal to a predetermined distance. With the above hydrogen filling system, determination as to whether to start cooling the hydrogen tank may be made on the basis of whether the distance between the mobile unit and the hydrogen supply source is shorter than or equal to the predetermined distance.

In addition, in the hydrogen filling system, the determination unit may determine to fill hydrogen into the hydrogen tank when the determination unit receives a command for filling hydrogen into the hydrogen tank from an operator of the mobile unit. With the above hydrogen filling system, determination as to whether to start cooling the hydrogen tank may be made on the basis of whether a command for filling hydrogen into the hydrogen tank is received from the operator of the mobile unit.

In addition, in the hydrogen filling system, the determination unit may determine to fill hydrogen into the hydrogen tank when an amount of hydrogen in the hydrogen tank is smaller than or equal to a predetermined amount. With the above hydrogen filling system, determination as to whether to start cooling the hydrogen tank is made on the basis of whether the amount of hydrogen in the hydrogen tank is smaller than or equal to the predetermined amount.

A second aspect of the invention provides a hydrogen filling method. The hydrogen filling method includes: determining whether to fill hydrogen into a hydrogen tank; and, when it is determined to fill hydrogen into the hydrogen tank, starting cooling the hydrogen tank before filling of hydrogen into the hydrogen tank is started.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a hydrogen filling system according to embodiments of the invention will be described with reference to the accompanying drawing. The configurations of the following embodiments are illustrative, and the hydrogen filling system according to the aspect of the invention is not limited to the configurations of the embodiments.

Figure 1:
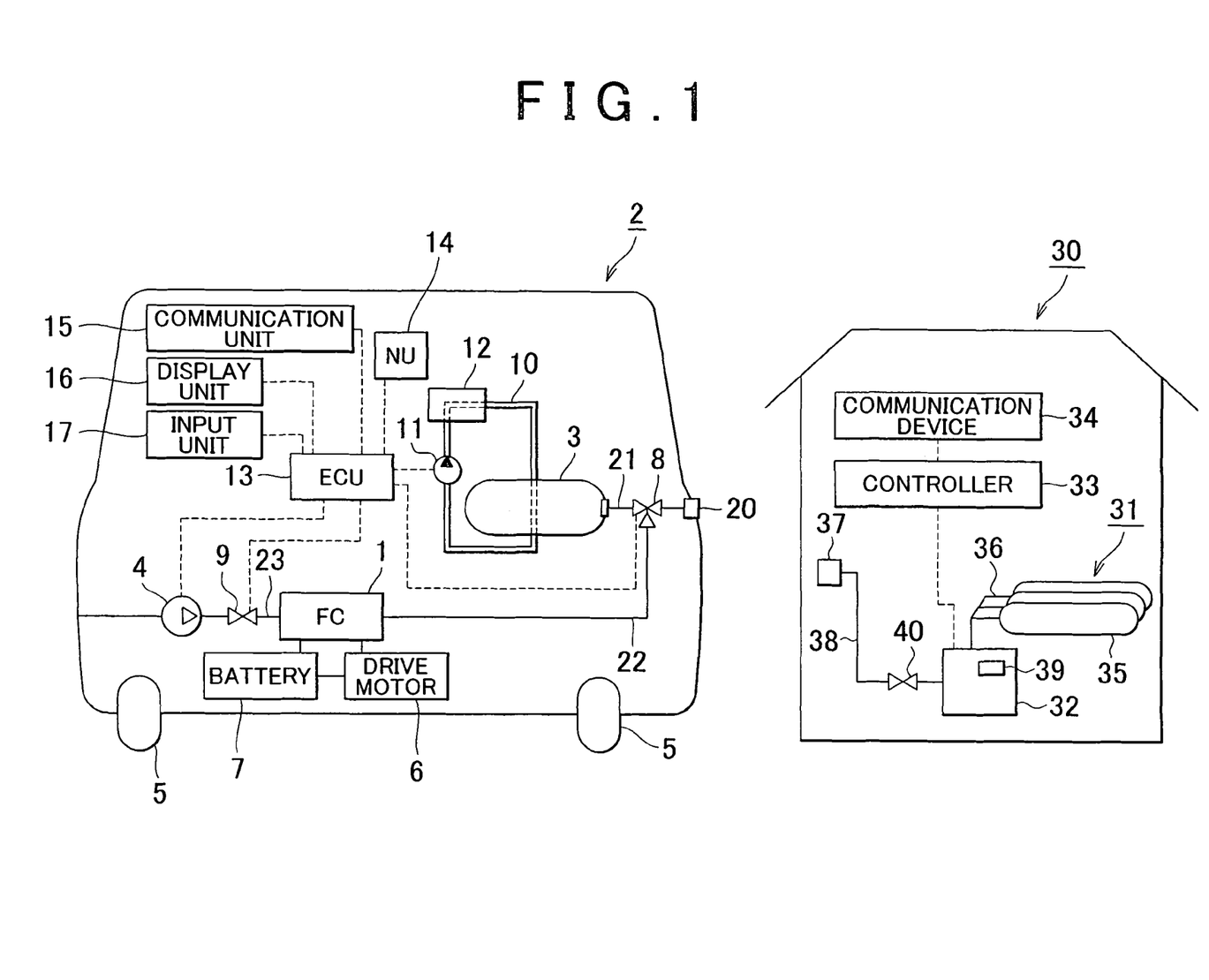
FIG. 1 is a view that shows the schematic configuration of a hydrogen filling system, a vehicle and a hydrogen station according to a first embodiment.

A hydrogen filling system according to a first embodiment of the invention will be described with reference to FIG. 1 and FIG. 2. FIG. 1 is a view that shows the schematic configuration of the hydrogen filling system, the schematic configuration of a vehicle 2, which is a mobile unit that uses electric power supplied from a fuel cell (hereinafter, also referred to as "FC") 1 as a drive source, and the schematic configuration of a hydrogen station (corresponding to hydrogen supply source) 30 that supplies hydrogen gas according to the first embodiment. The hydrogen filling system according to the first embodiment of the invention is an example in which the hydrogen filling system is applied to the vehicle 2, which is a mobile unit; however, the hydrogen filling system may also be applied to a mobile unit, such as a ship and a robot, other than the vehicle 2.

The vehicle 2 includes the fuel cell 1, a hydrogen tank 3, a compressor 4, drive wheels 5, a drive motor 6, a battery 7, a hydrogen flow rate regulating valve 8, an air flow rate regulating valve 9, a refrigerant flow passage 10, a pump 11, a radiator 12, an electronic control unit (hereinafter, also referred to as "ECU") 13, a navigation unit (hereinafter, also referred to as "NU") 14, a communication unit 15, a display unit 16 and an input unit 17.

The fuel cell 1 is, for example, a solid polymer electrolyte fuel cell; however, the fuel cell 1 is not limited to this. The fuel cell 1 may be a fuel cell of another type. The vehicle 2 runs and can move in such a manner that the drive wheels 5 are driven by the drive motor 6. The drive motor 6 is driven by electric motor supplied from the fuel cell 1 or the battery 7. The fuel cell 1 generates electric power by an electrochemical reaction between hydrogen gas filled in the hydrogen tank 3 and oxygen in air pumped by the compressor 4. The battery 7 is a chargeable and dischargeable electrical storage device, and stores electric power supplied from the fuel cell 1.

The hydrogen flow rate regulating valve 8 is provided for a pipe 21 and a pipe 22 that connect the fuel cell 1 with the hydrogen tank 3. The hydrogen flow rate regulating valve 8 is electrically connected to the electronic control unit 13. The electronic control unit 13 controls the open-close and opening degree of the hydrogen flow rate regulating valve 8. As the hydrogen flow rate regulating valve 8 is opened, hydrogen is supplied from the hydrogen tank 3 to the fuel cell 1. As the hydrogen flow rate regulating valve 8 is closed, supply of hydrogen from the hydrogen tank 3 to the fuel cell 1 is stopped. In addition, the electronic control unit 13 controls the opening degree of the hydrogen flow rate regulating valve 8 to thereby regulate the flow rate and pressure of hydrogen gas supplied to the fuel cell 1. The hydrogen tank 3 is coupled to the pipe 21 for which a hydrogen filling port 20 is provided. Hydrogen gas supplied from the hydrogen filling port 20 is filled into the hydrogen tank 3 via the pipe 21.

Start-stop driving of the compressor 4 is controlled by a control signal from the electronic control unit 13 that is electrically connected to the compressor 4. An air flow rate regulating valve 9 is provided for a pipe 23 that connects the fuel cell 1 with the compressor 4. The air flow rate regulating valve 9 is electrically connected to the electronic control unit 13. The electronic control unit 13 controls the air flow rate regulating valve 9 to thereby regulate the flow rate and pressure of air supplied to the fuel cell 1.

The fuel cell 1 is formed of a plurality of stacked cells. Each cell is formed of an electrolyte, a cathode, an anode and separators. An air flow passage and a hydrogen flow passage are formed between the cathode and the anode. At the anode of the fuel cell 1, as hydrogen gas is supplied, hydrogen ions are generated from hydrogen contained in hydrogen gas. In addition, oxygen contained in air is supplied to the cathode of the fuel cell 1. Then, in the fuel cell 1, an electrochemical reaction occurs between hydrogen and oxygen to generate electric energy. In addition, at the cathode of the fuel cell 1, hydrogen ions generated from hydrogen combine with oxygen to form water.

The hydrogen tank 3 and the radiator 12 are connected by the refrigerant flow passage 10. The refrigerant flow passage 10 is partially formed inside the hydrogen tank 3 and the radiator 12. The pump 11 is provided in the refrigerant flow passage 10. As the pump 11 is driven, refrigerant flowing through the refrigerant flow passage 10 circulates between the hydrogen tank 3 and the radiator 12. Refrigerant is, for example, a coolant; however, it is not limited to a coolant. Refrigerant may be an antifreeze or a fluid of any type.

Start-stop driving of the pump 11 or the driving amount of the pump 11 is controlled by a control signal from the electronic control unit 13 that is electrically connected to the pump 11. Thus, the flow rate of refrigerant flowing through the refrigerant flow passage 10 is regulated by the electronic control unit 13 and the pump 11.

The hydrogen tank 3 may be a high-pressure tank that is able to store high-pressure hydrogen gas inside or a tank that accommodates a hydrogen storage alloy inside. The high-pressure tank is configured to be able to store high-pressure hydrogen gas having a predetermined pressure (for example, 35 MPa or 70 MPa). When the high-pressure tank is used as the hydrogen tank 3, a hydrogen amount sensor (not shown) is provided for the hydrogen tank 3. The hydrogen amount sensor measures the amount of hydrogen in the hydrogen tank 3. The hydrogen amount sensor is electrically connected to the electronic control unit 13. Data of the amount of hydrogen in the hydrogen tank 3, measured by the hydrogen amount sensor, are transmitted to the electronic control unit 13.

The hydrogen tank 3 that accommodates a hydrogen storage alloy inside causes the hydrogen storage alloy to occlude hydrogen to thereby store hydrogen gas filled into the hydrogen tank 3, and causes the hydrogen storage alloy to release hydrogen to thereby discharge hydrogen gas from the hydrogen tank 3. The hydrogen storage alloy is pressurized or cooled in an atmosphere of hydrogen to occlude hydrogen, and is decompressed or heated to release hydrogen. The type of hydrogen storage alloy may be, for example, an AB2 alloy (Laves phase alloy), an AB5 alloy, a BCC alloy or other alloys (such as an Mg alloy).

When a tank that accommodates a hydrogen storage alloy inside is used as the hydrogen tank 3, a temperature sensor and a pressure sensor (both are not shown) are provided for the hydrogen tank 3. The temperature sensor measures the temperature inside the hydrogen tank 3. The temperature sensor is electrically connected to the electronic control unit 13, and data of the temperature inside the hydrogen tank 3, measured by the temperature sensor, are transmitted to the electronic control unit 13. The pressure sensor measures the pressure inside the hydrogen tank 3. The pressure sensor is electrically connected to the electronic control unit 13, and data of the pressure inside the hydrogen tank 3, measured by the pressure sensor, are transmitted to the electronic control unit 13.

The electronic control unit 13 holds experimental data that indicate the relationship between the pressure and temperature inside the hydrogen tank 3 and the hydrogen storage capacity of the hydrogen storage alloy, which is empirically obtained in advance. The electronic control unit 13 calculates the amount of hydrogen inside the hydrogen tank 3 on the basis of the data of the temperature and pressure inside the hydrogen tank 3, input from the pressure sensor and the temperature sensor, and the experimental data held by the electronic control unit 13.

Part of the refrigerant flow passage 10 is formed in the hydrogen tank 3. The temperature of refrigerant flowing through the refrigerant flow passage 10 in the hydrogen tank 3 increases by heat exchange with the hydrogen tank 3. The temperature of the hydrogen tank 3 decreases by heat exchange with refrigerant flowing through the refrigerant flow passage 10 in the hydrogen tank 3. That is, the hydrogen tank 3 is cooled by refrigerant flowing through the refrigerant flow passage 10 formed in the hydrogen tank 3. In this way, the temperature of the hydrogen tank 3 is regulated by refrigerant flowing through the refrigerant flow passage 10 in the hydrogen tank 3.

When the hydrogen tank 3 accommodates a hydrogen storage alloy inside, the hydrogen storage alloy may be located in proximity to the refrigerant flow passage 10 formed in the hydrogen tank 3. The temperature of refrigerant flowing through the refrigerant flow passage 10 in the hydrogen tank 3 increases by heat exchange with the hydrogen tank 3 and the hydrogen storage alloy. The temperature of the hydrogen tank 3 and the temperature of the hydrogen storage alloy decrease by heat exchange with refrigerant flowing through the refrigerant flow passage 10 in the hydrogen tank 3. That is, the hydrogen tank 3 and the hydrogen storage alloy are cooled by refrigerant flowing through the refrigerant flow passage 10 in the hydrogen tank 3. In this way, the temperature of the hydrogen tank 3 and the temperature of the hydrogen storage alloy are regulated by refrigerant flowing through the refrigerant flow passage 10 in the hydrogen tank 3.

Part of the refrigerant flow passage 10 is formed in the radiator 12. Outside air can pass through the radiator 12, and heat is exchanged between outside air passing through the radiator 12 and refrigerant flowing through the refrigerant flow passage 10 in the radiator 12. The temperature of refrigerant flowing through the refrigerant flow passage 10 in the radiator 12 decreases. The radiator 12 includes a cooling fan (not shown). Cooling air generated by driving the cooling fan cools refrigerant flowing through the refrigerant flow passage 10 in the radiator 12.

The electronic control unit 13 is formed of a central processing unit (CPU), a random access memory (RAM), a read only memory (ROM), an input/output interface, and the like. The navigation unit, 14 incorporates position acquiring means, such as a global positioning system (GPS) and a gyro sensor (both are not shown), for acquiring the current location of the vehicle 2. The navigation unit 14 computes a route from the current location of the vehicle 2 to a preset location and the distance of the route, and then outputs them to the electronic control unit 13.

The communication unit 15 receives radio waves to thereby receive information about a hydrogen station 30. The display unit 16 displays various pieces of information processed by the electronic control unit 13. The display unit 16 is, for example, a liquid crystal display, a plasma display panel, a cathode ray tube (CRT), an electroluminescence panel, or the like.

The hydrogen station 30 includes a gas accumulator 31, a dispenser 32, a controller 33 and a communication device 34. The gas accumulator 31 stores hydrogen gas. The dispenser 32 fills hydrogen gas, supplied from the gas accumulator 31, into the hydrogen tank 3 of the vehicle 2. The controller 33 controls devices, such as the dispenser 32. The communication device 34 carries out communication with the vehicle 2.

The gas accumulator 31 includes a plurality of gas cylinders 35 and a pipe 36. The plurality of gas cylinders 35 are filled with hydrogen gas at a predetermined pressure. The pipe 36 connects the plurality of gas cylinders 35. The pipe 36 is connected to the dispenser 32. Hydrogen gas flows from the gas cylinders 35 of the gas accumulator 31 into the dispenser 32 via the pipe 36. The dispenser 32 includes a filling coupler 37, a connecting pipe 38, a flow meter 39 and a flow rate control valve 40. The filling coupler 37 is provided at the distal end of the connecting pipe 38. As the filling coupler 37 is coupled to the hydrogen filling port 20, hydrogen gas is allowed to be filled from the dispenser 32 into the hydrogen tank 3.

The flow meter 39 measures the flow rate of hydrogen gas when hydrogen gas is filled into the hydrogen tank 3. The flow rate control valve 40 is provided for the connecting pipe 38. As the flow rate control valve 40 is opened, filling of hydrogen gas from the dispenser 32 into the hydrogen tank 3 is started. As the flow rate control valve 40 is closed, filling of hydrogen gas from the dispenser 32 into the hydrogen tank 3 is stopped. By regulating the opening degree of the flow rate control valve 40, the flow rate of hydrogen gas at the time of filling hydrogen gas into the hydrogen tank 3 is controlled, and hydrogen gas is filled into the hydrogen tank 3 at a predetermined pressure. The communication device 34 transmits radio waves to transmit information about the presence of the hydrogen station 30 or information about hydrogen gas supplied at the hydrogen station 30.

Figure 2:
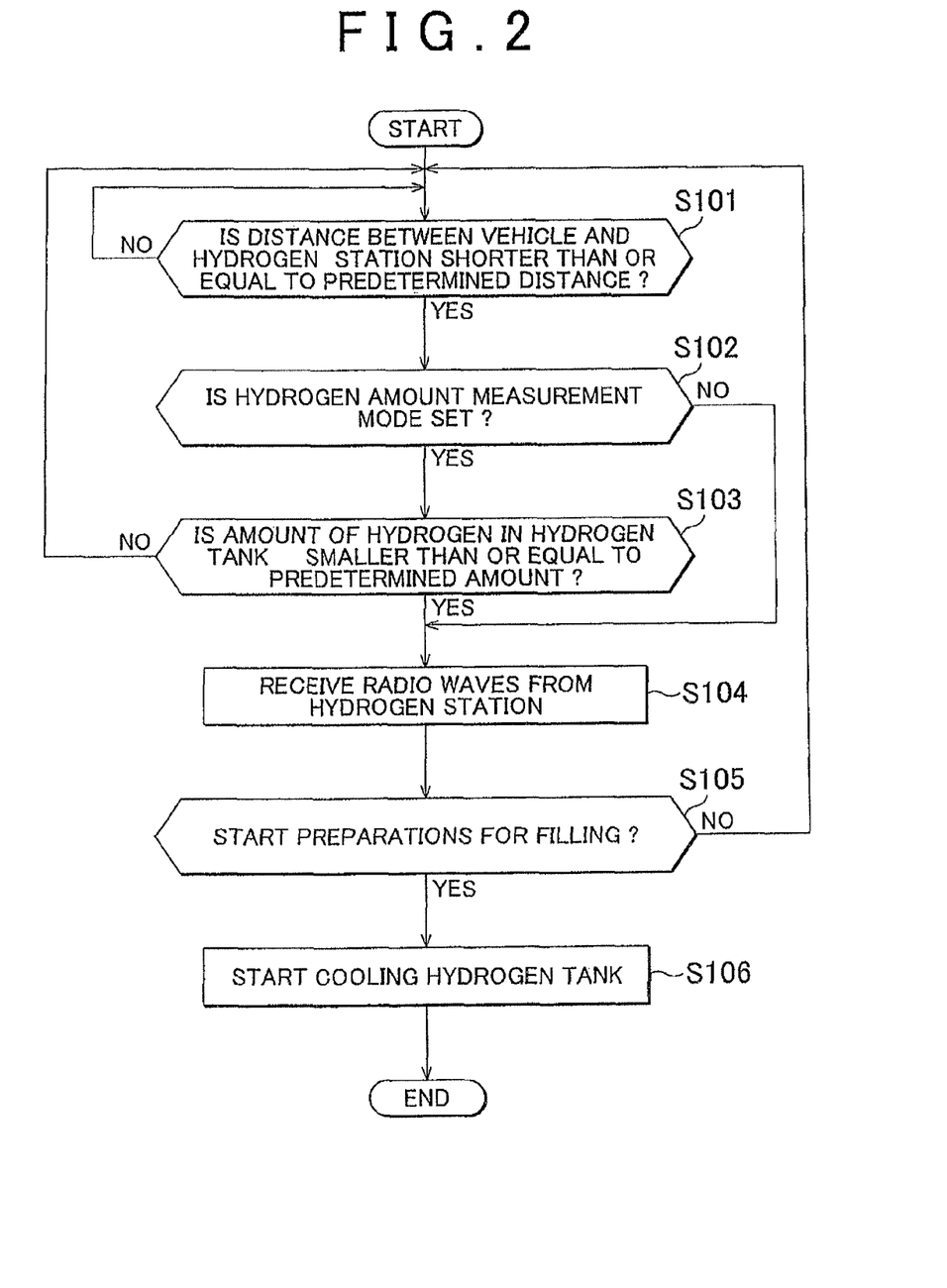
FIG. 2 is a flowchart that shows the flow of processes executed by the hydrogen filling system according to the first embodiment.

FIG. 2 is a flowchart that shows the flow of processes of the hydrogen filling system according to the first embodiment of the invention. The hydrogen filling system according to the first embodiment of the invention executes the processes shown in FIG. 2 when the process of starting power generation is executed on the fuel cell 1. For example, when an ignition switch is turned on, it may be determined that a command for starting power generation of the fuel cell 1 is issued and then the processes shown in FIG. 2 may be started.

In the process of step S101, the electronic control unit 13 determines whether the distance between the vehicle 2 and the hydrogen station 30 is shorter than or equal to a predetermined distance. Specifically, the electronic control unit 13 acquires, from the navigation unit 14, data of the distance from the current location of the vehicle 2 to the location of the hydrogen station 30. Then, the electronic control unit 13 determines whether the distance from the current location of the vehicle 2 to the location of the hydrogen station 30 is shorter than or equal to a predetermined distance. The predetermined distance is a factory default value, a value set at a dealer of the vehicle 2, a user set value, or the like.

When the distance between the vehicle 2 and the hydrogen station 30 is shorter than or equal to the predetermined distance (YES in the process of step S101), the electronic control unit 13 executes the process of step S102. On the other hand, when the distance between the vehicle 2 and the hydrogen station 30 is not shorter than or equal to the predetermined distance (NO in the process of step S101), the electronic control unit 13 executes the process of step S101 after a lapse of a predetermined period of time.

In the process of step S102, the electronic control unit 13 determines whether a hydrogen amount measurement mode is set. An operator of the vehicle 2 is allowed to set the hydrogen amount measurement mode through the input unit 17. In addition, the operator of the vehicle 2 is allowed to cancel the set hydrogen amount measurement mode through the input unit 17.

When the hydrogen amount measurement mode is set (YES in the process of step S102), the electronic control unit 13 executes the process of step S103. On the other hand, when the hydrogen amount measurement mode is not set (NO in the process of step S102), the electronic control unit 13 executes the process of step S104.

In the process of step S103, the electronic control unit 13 determines whether the amount of hydrogen in the hydrogen tank 3 is smaller than or equal to a predetermined amount. The predetermined amount is a factory default value, a value set at a dealer of the vehicle 2, a user set value, or the like. When the amount of hydrogen in the hydrogen tank 3 is smaller than or equal to the predetermined amount (YES in the process of step S103), the electronic control unit 13 executes the process of step S104. On the other hand, when the amount of hydrogen in the hydrogen tank 3 is not smaller than or equal to the predetermined amount (NO in the process of step S103), the electronic control unit 13 executes the process of step S101 after a lapse of a predetermined period of time.

In the process of step S104, the electronic control unit 13 receives radio waves from the hydrogen station 30 through the communication unit 15. The electronic control unit 13 receives radio waves from the hydrogen station 30 through the communication unit 15 to thereby check the presence of the hydrogen station 30 or whether it is allowed to be supplied with hydrogen gas at the hydrogen station 30.

As the process of step S104 is completed, the electronic control unit 13 executes the process of step S105. Note that the electronic control unit 13 may omit the process of step S104. That is, the electronic control unit 13 may execute the process of step S105 without executing the process of step S104.

In the process of step S105, the electronic control unit 13 inquires the operator of the vehicle 2 through the display unit 16 whether to start preparations for filling, and waits for a response to the inquiry. For example, the electronic control unit 13 causes the display unit 16 to display a message "Start preparations for filling hydrogen gas?", and then waits for a response to the message to be input to the input unit 17. Note that the electronic control unit 13 may omit the process of step S105. That is, the electronic control unit 13 may execute the process of step S106 without executing the process of step S105. When the processes of step S104 and step S105 are omitted, the electronic control unit 13 executes the process of step S106 instead of the process of step S104.

When the response input to the input unit 17 indicates to start preparations for filling (YES in the process of step S105), the electronic control unit 13 executes the process of step S106. On the other hand, when the response input to the input unit 17 indicates not to start preparations for filling (NO in the process of step S105), the electronic control unit 13 executes the process of step S101 after a lapse of a predetermined period of time.

In the process of step S106, the electronic control unit 13 drives the pump 11 to start cooling the hydrogen tank 3. When the pump 11 is driven to cause. refrigerant to flow through the refrigerant flow passage 10, cooling of the hydrogen tank 3 is started. When cooling of the hydrogen tank 3 is started, the electronic control unit 13 closes the hydrogen flow rate regulating valve 8. As the hydrogen flow rate regulating valve 8 is closed, supply of hydrogen gas from the hydrogen tank 3 to the fuel cell 1 is stopped. Thus, the fuel cell 1 generates electric power using hydrogen gas present in the fuel cell 1 or hydrogen gas present in the pipe 22 that connects the fuel cell 1 with the hydrogen tank 3.

The electronic control unit 13 controls the driving amount of the pump 11 to regulate the temperature of the hydrogen tank 3. The electronic control unit 13 drives the pump 11 continuously or intermittently until the vehicle 2 arrives at the hydrogen station 30 and then filling of hydrogen gas into the hydrogen tank 3 is completed. Before the vehicle 2 arrives at the hydrogen station 30, there is a possibility that the pipe 22 that connects the fuel cell 1 with the hydrogen tank 3 becomes empty of hydrogen gas necessary for the fuel cell 1 to generate electric power. In this case, the electronic control unit 13 stops the compressor 4 and then changes the supply source, which supplies electric power to the drive motor 6, from the fuel cell 1 to the battery 7.

Note that the electronic control unit 13 may receive a command for filling hydrogen from the operator of the vehicle through the input unit 17. When the electronic control unit 13 receives a command for filling hydrogen from the operator of the vehicle 2 through the input unit 17, the electronic control unit 13 executes the process of step S106. For example, even when the distance between the vehicle 2 and the hydrogen station 30 is not shorter than or equal to the predetermined distance (NO in the process of step S101), the electronic control unit 13 is allowed to start cooling the hydrogen tank 3 when the electronic control unit 13 receives a command for filling hydrogen from the operator of the vehicle 2 through the input unit 17. In addition, in this case, the electronic control unit 13 may receive radio waves from the hydrogen station 30 through the communication unit 15.

In the processes shown in FIG. 2, executed by the hydrogen filling system, the processes of step S101, step S102 and step S103 are executed sequentially; however, the aspect of the invention is not limited to this. For example, the process of step S101 in the processes shown in FIG. 2, executed by the hydrogen filling system, may be executed after the process of step S102 or step S103 is executed. In this case, when negative determination is made in the process of step S102 in the processes shown in FIG. 2, executed by the hydrogen filling system, the electronic control unit 13 executes the process of step S101, and then, when affirmative determination is made in the process of step S101, executes the process of step S103. Then, when affirmative determination is made in the process of step S103 in the processes shown in FIG. 2, executed by the hydrogen filling system, the electronic control unit 13 executes the process of step S101, and then, when affirmative determination is made in the process of step S101, executes the process of step S104. On the other hand, when negative determination is made in the process of step S103 in the processes shown in FIG. 2, executed by the hydrogen filling system, the electronic control unit 13 executes the process of step S 103 again after a lapse of a predetermined period of time.

In addition, in the processes shown in FIG. 2, executed by the hydrogen filling system, all the processes of step S101, step S102 and step S103 are executed; however, the aspect of the invention is not limited to this. For example, the processes of step S101 and step S102 in the processes shown in FIG. 2, executed by the hydrogen filling system, may be omitted. In this case, when negative determination is made in the process of step S103 in the processes shown in FIG. 2, executed by the hydrogen filling system, the electronic control unit 13 executes the process of step S103 again after a lapse of a predetermined period of time. In addition, for example, the processes of step S102 and step S103 in the processes shown in FIG. 2, executed by the hydrogen filling system, may be omitted. In this case, when affirmative determination is made in the process of step S101 in the processes shown in FIG. 2, executed by the hydrogen filling system, the electronic control unit 13 executes the process of step S104.

A hydrogen filling system according to a second embodiment of the invention will be described with reference to FIG. 3. The hydrogen filling system according to the second embodiment differs from the hydrogen filling system according to the first embodiment in a cooling method for the hydrogen tank 3 and a technique related to the cooling method. Then, the second embodiment will be described focusing on the above difference. Note that like reference numerals denote similar components to those of the hydrogen filling system according to the first embodiment, and the description thereof is omitted. In addition, FIG. 2 will be referred to where necessary.

Figure 3:
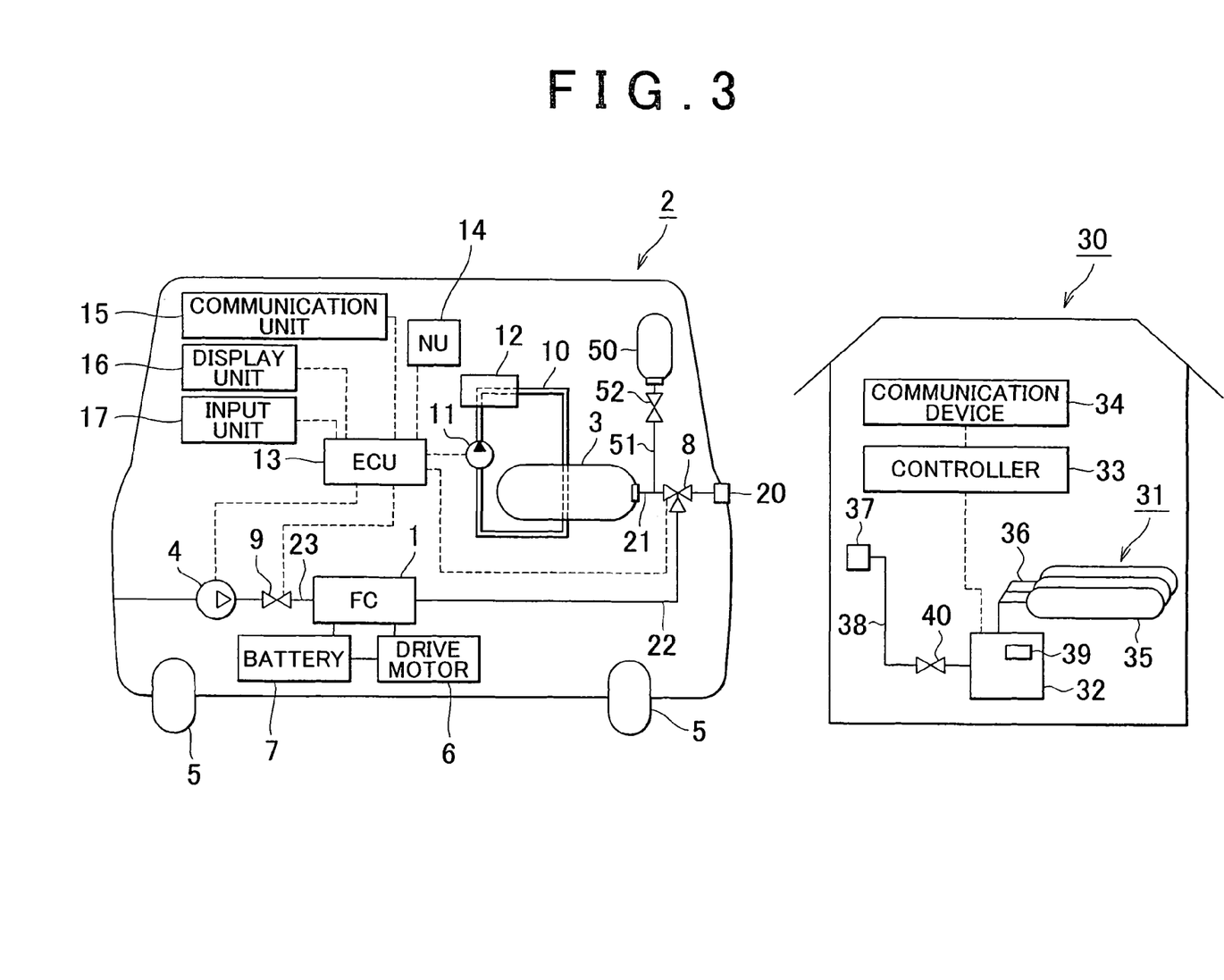
FIG. 3 is a view that shows the schematic configuration of a hydrogen filling system, a vehicle and a hydrogen station according to a second embodiment.

FIG. 3 is a view that shows the schematic configuration of the hydrogen filling system, the schematic configuration of the vehicle 2 and the schematic configuration of the hydrogen station 30 according to the second embodiment. The vehicle 2 according to the second embodiment further includes a buffer tank 50, a pipe 51 and a valve 52 in comparison with the vehicle 2 according to the first embodiment. The buffer tank 50 is a tank that is capable of temporarily contain hydrogen gas; however, the buffer tank 50 is not limited to this. For example, the buffer tank 50 may be a pipe having a volume larger than a certain value or a tank that accommodates a hydrogen storage alloy.

The buffer tank 50 is connected to the hydrogen tank 3 via the pipe 51 and the pipe 21. The valve 52 is provided for the pipe 51. The valve 52 is electrically connected to the electronic control unit 13. The electronic control unit 13 controls the open-close and opening degree of the valve 52. As the valve 52 is opened, hydrogen gas discharged from the hydrogen tank 3 is contained in the buffer tank 50.

In the hydrogen filling system according to the first embodiment, the hydrogen tank 3 is cooled by refrigerant flowing through the refrigerant flow passage 10 formed in the hydrogen tank 3. In the hydrogen filling system according to the second embodiment, additionally, the hydrogen tank 3 may be cooled by discharging hydrogen gas in the hydrogen tank 3.

As hydrogen gas in the hydrogen tank 3 is discharged, the hydrogen tank 3 is cooled by adiabatic cooling due to adiabatic expansion that occurs at the time when hydrogen gas in the hydrogen tank 3 is discharged. The electronic control unit 13 opens the valve 52 to discharge hydrogen gas in the hydrogen tank 3 to thereby regulate the temperature of the hydrogen tank 3.

In the case of the hydrogen tank 3 that accommodates a hydrogen storage alloy inside, when hydrogen gas in the hydrogen tank 3 is discharged, the pressure of hydrogen gas in the hydrogen tank 3 is reduced, so hydrogen is released from the hydrogen storage alloy. The hydrogen storage alloy is cooled by an endothermic reaction that occurs at the time when hydrogen is released from the hydrogen storage alloy. Hydrogen gas discharged from the hydrogen tank 3 is temporarily contained in the buffer tank 50. Hydrogen gas contained in the buffer tank 50 is supplied to the fuel cell 1 and is used in power generation of the fuel cell 1.

In the process of step S106 in the processes shown in FIG. 2, executed by the hydrogen filling system according to the first embodiment, the electronic control unit 13 drives the pump 11 to start cooling the hydrogen tank 3. In the processes executed by the hydrogen filling system according to the second embodiment, the electronic control unit 13 further opens the valve 52 to start cooling the hydrogen tank 3. Alternatively, in the processes executed by the hydrogen filling system according to the second embodiment, the electronic control unit 13 may open the valve 52 to start cooling the hydrogen tank 3 without driving the pump 11.

In the hydrogen filling system according to the second embodiment, the buffer tank 50, the pipe 51 and the valve 52 are added to the vehicle 2. Other than this, the refrigerant flow passage 10, the pump 11 and the radiator 12 of the vehicle 2 may be removed.

According to the first and second embodiments, before a start of filling of hydrogen gas into the hydrogen tank 3, cooling of the hydrogen tank 3 is started. That is, before the vehicle 2 arrives at the hydrogen station 30, cooling of the hydrogen tank 3 is started. Cooling of the hydrogen tank is started before the vehicle 2 arrives at the hydrogen station 30, so the hydrogen tank 3 is sufficiently cooled. Because hydrogen gas is filled into the hydrogen tank 3 in a state where the hydrogen tank 3 is sufficiently cooled, it is possible to reduce a period of time during which hydrogen gas is filled into the hydrogen tank 3.

Because a period of time during which hydrogen gas is filled into the hydrogen tank 3 is reduced, a period of time during which the vehicle 2 stops at the hydrogen station 30 is reduced. As a result, in comparison with a case where cooling of the hydrogen tank 3 is started after the vehicle 2 arrives at the hydrogen station 30, a period of time during which the vehicle 2 stops at the hydrogen station 30 is reduced.

According to the first and second embodiments, the electronic control unit 13 may determine whether the distance between the vehicle 2 and the hydrogen station 30 is shorter than or equal to a predetermined distance. When the distance between the vehicle 2 and the hydrogen station 30 is shorter than or equal to the predetermined distance, cooling of the hydrogen tank 3 may be started. By so doing, determination as to whether to start cooling the hydrogen tank 3 may be made on the basis of whether the distance between the vehicle 2 and the hydrogen station 30 is shorter than or equal to the predetermined distance.

According to the first and second embodiments, the electronic control unit 13 may determine whether the amount of hydrogen in the hydrogen tank 3 is smaller than or equal to a predetermined amount. When the amount of hydrogen in the hydrogen tank 3 is smaller than or equal to the predetermined amount, cooling of the hydrogen tank 3 may be started. By so doing, determination as to whether to start cooling the hydrogen tank 3 may be made on the basis of whether the amount of hydrogen in the hydrogen tank 3 is smaller than or equal to the predetermined amount.

According to the first and second embodiments, the electronic control unit 13 may inquire the operator of the vehicle 2 through the display unit 16 whether to start preparations for filling. When the response input to the input unit 17 indicates to start preparations for filling, cooling of the hydrogen tank 3 may be started. By so doing, determination as to whether to start cooling the hydrogen tank 3 may be made on the basis of whether the response input to the input unit 17 indicates to start preparations for filling.

When hydrogen gas is continuously supplied from the hydrogen tank 3 to the fuel cell 1, the pressure of hydrogen gas in the hydrogen tank 3 decreases. Therefore, there is a possibility that the hydrogen tank 3 becomes unable to supply hydrogen gas to the fuel cell 1 even when hydrogen gas remains in the hydrogen tank 3. The residual amount of hydrogen gas in the hydrogen tank 3 that has become unable to supply hydrogen gas to the fuel cell 1 depends on the temperature of the hydrogen tank 3.

For example, when the temperature of the hydrogen tank 3 is 60° C., the residual amount of hydrogen gas in the hydrogen tank 3 is about 5% with respect to the filling amount of hydrogen gas (for example, SOC 80%); when the temperature of the hydrogen tank 3 is 40° C., the residual amount of hydrogen gas in the hydrogen tank 3 is about 10% with respect to the filling amount of hydrogen gas (for example, SOC 80%). Thus, a higher temperature of the hydrogen tank 3 can reduce the residual amount of hydrogen gas in the hydrogen tank 3 that has become unable to supply hydrogen gas to the fuel cell 1. That is, the amount of usage of hydrogen gas filled in the hydrogen tank 3 may be increased. That is, the hydrogen tank may be kept at a predetermined temperature or above until it is determined to fill hydrogen into the hydrogen tank.

When the temperature of the hydrogen tank 3 is a temperature (for example, 40° C.) lower than a normal temperature (for example, 60° C.), the residual amount of hydrogen gas in the hydrogen tank 3 that has become unable to supply hydrogen gas to the fuel cell 1 increases. Then, the hydrogen tank 3 is kept at a normal temperature (for example, 60° C.), and, when the hydrogen tank 3 has become unable to supply hydrogen gas to the fuel cell 1, cooling of the hydrogen tank 3 is started. By so doing, the amount of usage of hydrogen gas filled in the hydrogen tank 3 may be increased, and a period of time during which hydrogen gas is filled into the hydrogen tank 3 may be reduced.

The invention claimed is:

1. A hydrogen filling system comprising:
    a mobile body that has a hydrogen tank that is filled with hydrogen supplied from a hydrogen supply source;
    a temperature regulating unit that regulates a temperature of the hydrogen tank; and
    a determination unit that determines whether to fill hydrogen into the hydrogen tank,
    wherein when the determination unit determines to fill hydrogen into the hydrogen tank, the temperature regulating unit starts cooling the hydrogen tank before filling of hydrogen into the hydrogen tank is started, and
    wherein the determination unit includes a distance calculation unit that calculates a distance between the mobile body and the hydrogen supply source, and determines to fill hydrogen into the hydrogen tank when the distance between the mobile body and the hydrogen supply source is shorter than or equal to a predetermined distance.

2. The hydrogen filling system according to claim 1, wherein the determination unit determines to fill hydrogen into the hydrogen tank when the determination unit receives a command for filling hydrogen into the hydrogen tank from an operator of the mobile body.

3. The hydrogen filling system according to claim 1, wherein the determination unit determines to fill hydrogen into the hydrogen tank when an amount of hydrogen in the hydrogen tank is smaller than or equal to a predetermined amount.

* * * * *